(12) United States Patent
Yoshimura et al.

(10) Patent No.: US 6,562,218 B2
(45) Date of Patent: May 13, 2003

(54) METHOD FOR FORMING A THIN FILM

(75) Inventors: Masahiro Yoshimura, Kanagawa Pref. (JP); Seung-wan Song, Tokyo (JP); Tomoaki Watanabe, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 0 days.

(21) Appl. No.: 09/810,755

(22) Filed: Mar. 16, 2001

(65) Prior Publication Data

US 2001/0052463 A1 Dec. 20, 2001

(30) Foreign Application Priority Data

Mar. 17, 2000 (JP) ........................................ 2000-076423
Feb. 15, 2001 (JP) ........................................ 2001-037901

(51) Int. Cl.$^7$ .......................... C25D 5/20; C25D 11/00; C25D 3/56; H01M 10/44
(52) U.S. Cl. ........................ 205/148; 205/333; 205/238; 205/256; 205/59
(58) Field of Search ................................ 205/148, 333, 205/238, 256, 59

(56) References Cited

U.S. PATENT DOCUMENTS

| | | | |
|---|---|---|---|
| 3,520,780 A | 7/1970 | Findl et al. ..................... 204/3 |
| 3,922,208 A | * 11/1975 | Cordone et al. ............... 204/16 |
| 4,514,266 A | * 4/1985 | Cole et al. ..................... 204/28 |
| 5,198,095 A | * 3/1993 | Urakawa et al. ............. 205/138 |
| 5,597,661 A | 1/1997 | Takeuchi et al. ............... 429/42 |

FOREIGN PATENT DOCUMENTS

EP    0 319 489    6/1989
JP    11140661    11/1997

OTHER PUBLICATIONS

Watanabe et al., "Integration of Oxide Ceramic Films by Soft Solution Processing With Solution Flow Cell", Preprints of Annual Meeting of the Ceramic Society of Japan, (month unavailable) 1999, p. 179.*

Fujiwara et al., "Direct Fabrication of LiCoO2 Films on Papers by Electrodeposition Method With Interfacial Reaction", International Conference on Processing Materials for Properties, Proceedings, 2nd, San Francisco, CA, US, Nov. 5–8, 2000. Abstract only.*

Watanabe, Ot., et al. (1999) *Integration of Oxide Ceramic Films by Soft Solution Processing with Solution Flow Cell.* Preprints of Annual Meeting of The Ceramic Society of Japan, 1999, p. 179. Month unavailable.

Yoshimura et al. "Direct fabrication of thin–film LiNiO$_2$ electrodes in LiOH solution by electrochemical–hydrothermal method." Solid State Ionics 106 (1998) pp. 39–44. No month unavailable.

* cited by examiner

*Primary Examiner*—Edna Wong
(74) *Attorney, Agent, or Firm*—Knobbe Martens Olson & Bear LLP

(57) ABSTRACT

A reactive solution with an amount of 250 mL is made of distilled water and LiOH·H$_2$O (4M) melted in the distilled water. Then, the reactive solution is put in a flow-type reactor, and is flown in between an anode electrode and a cathode electrode set in the flow-type reactor at a given temperature and a given flow rate. Then, a given voltage is applied between the anode electrode and the cathode electrode with dropping an oxidizer of hydrogen peroxide (H$_2$O$_2$) into the reactive solution to form a lithium-cobalt oxide thin film on the anode electrode.

6 Claims, 1 Drawing Sheet

METHOD FOR FORMING A THIN FILM

BACKGROUND OF THE INVENTION

1. Field of the Invention

This invention relates to a method for forming a thin film, particularly to a method for forming a thin film suitable for a secondary battery field usable for mobile electronic device and electric automobiles.

2. Related Art Statement

So far, a sol-gel method, a CVD method or a PVD method is employed as a thin film-forming method. These methods require multistage process including a heating process, a high vacuum condition, or a high energy condition accompanied with a substrate-heating process or a plasma-generating process. Therefore, those methods require large scale and complicate apparatus, resulting in large cost and complicate operationality in use.

Moreover, the above high energy condition runs counter to global environmental protection, resource saving and energy saving. Therefore, a new thin film-forming method without the above high energy condition has been desired.

SUMMARY OF THE INVENTION

It is an object of the present invention to provide a new thin film-forming method not including a high energy condition due to firing, heating or plasma generation.

This invention relates to a method for forming a thin film (hereinafter, often called as a "first thin film-forming method) comprising the steps of:

setting an anode electrode and a cathode electrode in a reactive solution, flowing the reactive solution in between the anode electrode and the cathode electrode at a given flow rate, and applying a given voltage between the anode electrode and the cathode electrode, thereby to synthesize a compound thin film including the components of the reactive solution and the anode electrode on the anode electrode.

This invention also relates to a method for forming a thin film (hereinafter, often called as a "second thin film-forming method) comprising the steps of:

setting an anode electrode and a cathode electrode in a reactive solution, flowing the reactive solution in between the anode electrode and the cathode electrode at a given flow rate, and applying a given voltage between the anode electrode and the cathode electrode, thereby to synthesize a compound thin film including the components of the reactive solution and the anode electrode on a given substrate arranged in the flow direction of the reactive solution.

The inventors related to the present invention have been intensely studied for developing a new thin film-forming method not including a high energy process. As a result, they have found out surprisingly that when a reactive solution incorporating a component of a desired thin film is flown in between an anode electrode and a cathode electrode to which a given voltage is applied, the desired compound thin film including the component of the reactive solution and another component of the anode electrode is synthesized directly on the anode electrode. Then, they have also found out that when the anode electrode and the cathode electrode are set in a static reactive solution and a given voltage is applied between the anode electrode and the cathode electrode, the compound thin film is not synthesized on the anode electrode.

The first thin film-forming method of the present invention is made on the discovery of the above phenomenon. The first thin film-forming method enables the desired compound thin film to be formed directly on the anode electrode without the high energy condition including the substrate-heating process and the plasma generation.

Moreover, the inventors have found out that if the flow rate of the reactive solution and the voltage applied between the anode electrode and the cathode electrode are controlled appropriately, the compound thin film composed of the components of the reactive solution and the anode electrode can be synthesized on a given substrate which is arranged in the flow direction of the reactive solution.

The cause of the thin film formation on the given substrate may be considered as follows: That is, the reactive solution erodes and melts the superficial parts of the anode electrode, and thus, the melted anode electrode material and the reactive solution arrive at and synthesized on the substrate.

The second thin film-forming method of the present invention is made on the discovery of the above phenomenon. The second thin film-forming method enables the compound thin film to be formed on the given substrate without the high energy condition including the substrate-heating process and the plasma generation.

BRIEF DESCRIPTION OF THE DRAWINGS

The invention will be more particularly described with reference to the accompanying drawings.

DESCRIPTION OF THE PREFERRED EMBODIMENTS

Figure 1:
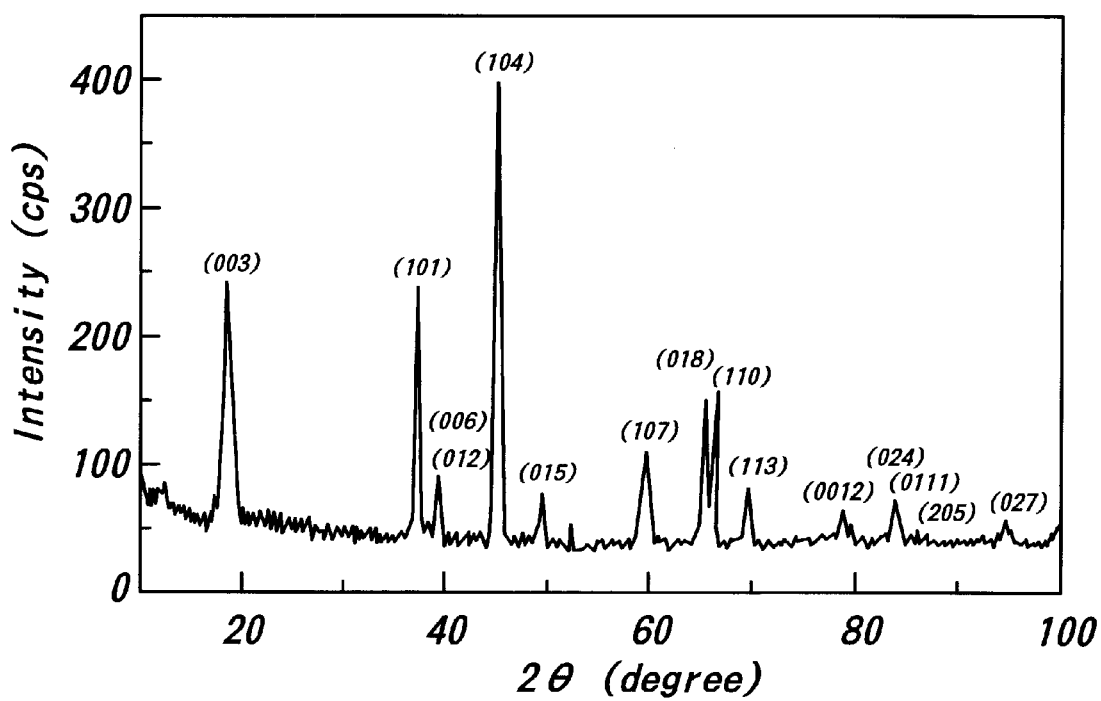
FIG. 1 is a graph showing a X-ray diffraction spectrum of a lithium—cobalt oxide thin film synthesized by the thin film-forming method of the present invention.

The invention will be described in detail as follows.

In the first thin film-forming method of the present invention, the flow rate of the reactive solution is not restricted even if the compound thin film, composed of the components of the reactive solution and the anode electrode, can be synthesized on the anode electrode. The flow rate of the reactive solution is determined on the kind of the reactive solution, the anode electrode material, the kind of the compound thin film to be formed and the forming speed of the compound thin film.

However, it is preferable that the upper limit value of the flow rate of the reactive solution is 100 mL/minute, particularly 20 mL/minute. Moreover, it is preferable that the lower limit value of the flow rate of the reactive solution is 1 mL/minute, particularly 5 mL/minute. Thereby, irrespective of the kinds of the reactive solution and the anode electrode material or the like, the compound thin film can be formed on the anode electrode uniformly.

The voltage to be applied between the anode electrode and the cathode electrode is not restricted even if the compound thin film is formed on the anode electrode according to the present invention. However, it is preferable that the voltage is applied so that a current with a range of 0.01–5 $mA/cm^3$ is flown between the anode electrode and the cathode electrode. Thereby, the compound thin film can be formed uniformly with the enhancement of the thin film-forming speed.

In the second thin film-forming method of the present invention, the flow rate of the reactive solution is not limited even if the compound thin film, composed of the components of the reactive solution and the anode electrode, can be formed on the given substrate.

However, it is desired that the upper limit value of the flow rate of the reactive solution is 200 mL/minute, particularly 50 mL/minute. Moreover, it is desired that the lower limit value of the flow rate of the reactive solution is 2 mL/minute, particularly 5 mL/minute. Thereby, the reactive solution can erode the superficial parts of the anode electrode effectively, and transport the thus melted anode electrode material on the given substrate.

As mentioned in the first thin film-forming method, it is desired that the voltage is applied between the anode electrode and the cathode electrode so that a current with a range of 1–5 mA/cm$^3$ is flown therebetween. The reactive solution is selected on the kind of the compound thin film to be formed.

In the second thin film-forming method of the present invention, the cathode electrode and the anode electrode may be made of a well known electrode material. Moreover, the substrate may be made of any material in any shape, depending on the use of the compound thin film.

Moreover, in the first thin film-forming method of the present invention, the cathode electrode may be made of a well known electrode material, and the anode electrode may be made of a given material depending on the kind of the compound thin film. For example, in formation of a lithium—cobalt thin film, a cobalt electrode may be used as the anode electrode.

If an oxide thin film is formed on the anode electrode according to the thin film-forming method of the present invention, it is desired to incorporate an oxidizer in the reactive solution. Thereby, the components of the reactive solution and the anode electrode can be easily oxidized, the oxide thin film can be formed on the anode electrode or the substrate uniformly in a short time.

Hydrogen peroxide ($H_2O_2$) and $Na_2S_2O_3$ may be exemplified as the oxidizer. Particularly, in the formation of the lithium-cobalt thin film, the hydrogen peroxide is preferably used.

EXAMPLES

This invention will be concretely described with reference to the following examples.

First of all, a cobalt electrode as the anode electrode and a platinum electrode as the cathode electrode were set in a flow-type reactor.

Then, a reactive solution with an amount of 250 mL was made of distilled water and LiOH·$H_2O$ (4M) melted in the distilled water. The reactive solution was put in the flow-type reactor, and then, held at 150° C. and flown in between the cobalt electrode and the platinum electrode at a flow rate of 5 mL/minute.

Then, a given voltage was applied between the electrodes so that a current density of 1 mA/cm$^3$ was flown therebetween, and hydrogen peroxide ($H_2O_2$) was dropped off into the reactive solution at a rate of 1 mL/minute.

Three hours later, the cobalt electrode was taken out of the flow-type reactor, and the surface of the cobalt electrode was analyzed by X-ray diffraction. The thus obtained X-ray diffraction pattern was shown in FIG. 1.

As is apparent from FIG. 1, diffraction peaks from hexagonal $LiCoO_2$ (R3m) are observed on the surface of the cobalt electrode. That is, it is turned out that a compound thin film made of $LiCoO_2$ crystal is formed on the cobalt electrode as the anode electrode.

Moreover, it is turned out that from SEM observation, the compound thin film has a layered structure.

Although this invention has been described in detail with reference to the above examples, this invention is not limited to the above disclosure and every kind of variation and modification can be made without departing from the scope of the present invention.

According to the present invention, a compound thin film can be directly synthesized on an anode electrode or a given substrate at room temperature. Therefore, a high energy condition including a high temperature substrate heating process, a plasma generation or the like is not required, different from a conventional CVD method and PVD method. As a result, a new thin film-forming method not including the high energy condition can be provided.

What is claimed is:

1. A method for forming a thin film comprising the steps of:

setting an anode electrode, cathode electrode, and a substrate in a reactive solution, flowing the reactive solution in between the anode electrode and the cathode electrode at a given flow rate, and applying a given voltage between the anode electrode and the cathode electrode, thereby to synthesize a compound thin film including the components of the reactive solution and the anode electrode on the given substrate arranged in the flow direction of the reactive solution.

2. A method for forming a thin film as defined in claim 1, wherein the flow rate of the reactive solution is set within 2–200 mL/minute.

3. A method for forming a thin film as defined in claim 1 or 2, further comprising the step of incorporating an oxidizer in the reactive solution, whereby an oxide thin film including the components of the reactive solution and anode electrode is formed on the given substrate.

4. A method for forming a thin film comprising the steps of:

setting an anode electrode composed of a cobalt electrode and a cathode electrode in a reactive solution composed of a lithium hydroxide water solution, incorporating an oxidizer in the reactive solution, flowing the reactive solution in between the anode electrode and the cathode electrode at a given flow rate, and applying a given voltage between the anode electrode and the cathode electrode, thereby to synthesize a lithium cobalt thin film as an oxide thin film including the components of the reactive solution and the anode electrode on a given substrate arranged in the flow direction of the reactive solution.

5. A method for forming a thin film as defined in claim 4, wherein the oxidizer is hydrogen peroxide.

6. A method for forming a thin film as defined in claim 4, wherein the flow rate of the reactive solution is set within 2–200 mL/minute.

* * * * *